Oct. 25, 1927.
A. F. NEWLANDS ET AL
1,646,868
ADJUSTABLE FINDER
Filed March 11, 1927
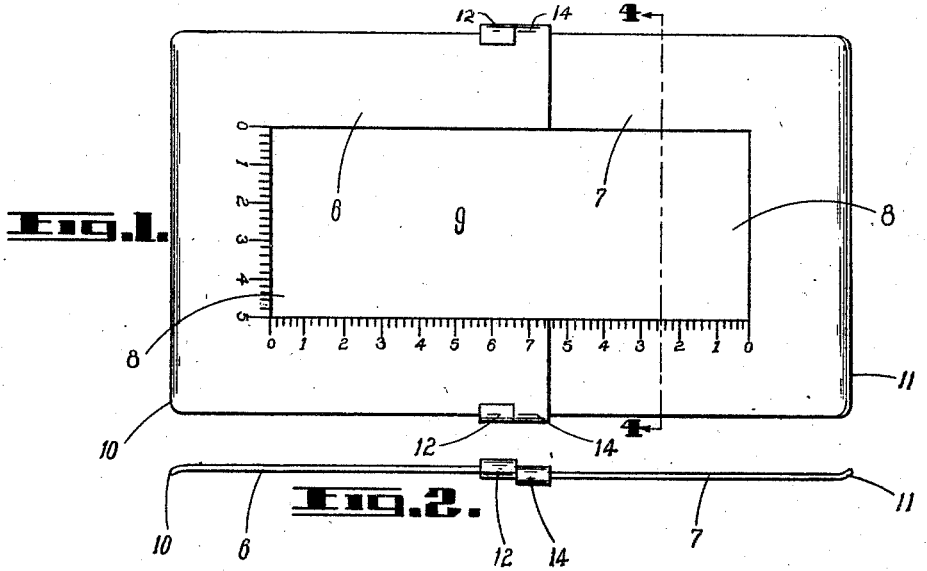
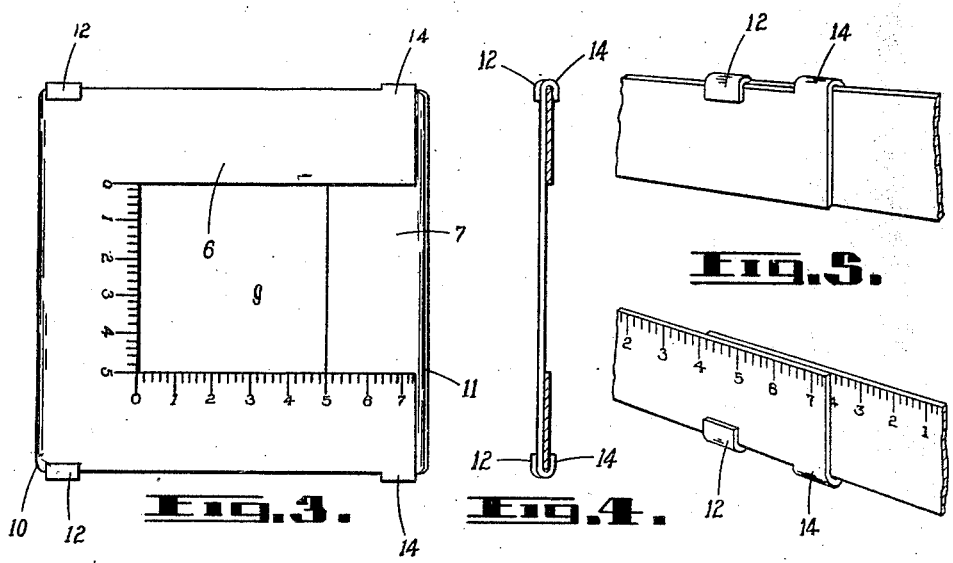
ALEXANDER F. NEWLANDS,
ERNEST FOSBERY,
INVENTORS.
BY Harold C. Shipman
ATTORNEY.

Patented Oct. 25, 1927.

1,646,868

UNITED STATES PATENT OFFICE.

ALEXANDER F. NEWLANDS AND ERNEST FOSBERY, OF OTTAWA, ONTARIO, CANADA.

ADJUSTABLE FINDER.

Application filed March 11, 1927. Serial No. 174,666.

This invention relates to an adjustable finder for the use of artists, photographers and others and its principal object is to aid such artists in making a choice of a certain portion of the subject for a picture.

A further object is to provide a finder, which can be adjusted, so that the artist can decide definitely the relative proportions best adapted for the picture.

A further object is to provide an adjustable finder provided with divisional indications, so that the artist may first decide the portion of the subject to be taken in for the picture desired and then calculate on the canvas to be used the corresponding relative proportions.

With the foregoing and other objects in view, as will appear as the description proceeds, the invention consists of the novel construction, combination and arrangement of co-operating elements as hereinafter more specifically set forth, claimed and shown in the accompanying drawings forming a part of the present application, in which:

Fig. 1 is a plan view of the preferred embodiment of our invention, the same being shown in full opened position.

Fig. 2 is a side view of the same.

Fig. 3 is a plan view of the preferred embodiment of our invention, the same being shown in closed position.

Fig. 4 is a sectional view taken on the line 4—4 of Fig. 1.

Fig. 5 is a perspective view showing broken portions of the interlocking side members of the preferred embodiment of our invention.

Like numerals of reference designate corresponding parts throughout the different views.

The finder may be made from sheet metal or celluloid, but we do not wish to limit ourselves to any particular material. The finder is made of two separate members 6 and 7, which members are preferably of a corresponding size and shape. Each member has a cut out central portion 8, which portions are cut from the meeting ends of the members 6 and 7 to provide a vision opening 9 therebetween as clearly shown in Fig. 1. The edges around this opening are preferably in parallel alignment with the corresponding outer edges of the members 6 and 7.

In the drawings, Fig. 1, it will be noted that we have provided certain divisional indications across one end of the member 6 adjacent to its respective cut out portion 8. We have also placed divisional indications along one side of the members 6 and 7 respectively adjacent to their cut out portions 8. The purpose of these divisional indications will be referred to hereinafter. If desired, divisional indications may be provided around all four sides of the vision opening 9.

The outer ends of the members 6 and 7 are slightly curved in opposite directions as indicated at 10 and 11 respectively. The inner ends of the members 6 and 7 are provided with outwardly directed lugs 12 and 14 respectively. The lugs of one member are bent over the other member to provide an interlocking engagement between the members 6 and 7 in such a manner that the members 6 and 7 may be reciprocated relative to each other in order to vary the length of the opening 9.

From the drawings, Fig. 3, it will be noted that when the two members 6 and 7 are moved to their full closed position, the opening 9 will be an exact square. When in this position, the lugs 12 come in contact with the curved end portion 10 and the lugs 14 come in contact with the end portion 11, which curved end portions act as a stop against further movement of the members 6 and 7 in that direction. We do not wish to be limited to the use of the curved end portions 10 and 11 as stop members against further movement of the members 6 and 7 in their closing-together movement as other means may be designed for obtaining the same desired result.

The adjustable feature of this finder allows of openings of all proportions that an artist or photographer would be likely to use. By holding the finder between the eye and the subject, the artist sees the subject through the vision opening 9, framed by the members 6 and 7 and can decide definitely the proportions of the rectangle that will be best for the picture. By holding the finder nearer to or farther from the eye, more or less of the subject may be included and the artist can decide before beginning the picture just how much should be included and its exact disposition on the canvas.

By means of the divisional indications, the members 6 and 7 may be adjusted to the proportions of the canvas that it is desired to use; or the members 6 and 7 may be adjusted to a proportion that best suits the subject and the proportions for a canvas necessary to give the same effect read off from the divisional indications.

The foregoing specification and annexed drawings disclose the preferred embodiment of our invention, but it is to be understood that minor changes may be resorted to in the commerical adaptation of our invention without departing from the scope of the invention as hereinbefore claimed.

What we claim as new is:

1. In a finder comprising a pair of members, each having a central portion cut from one end to provide a vision opening; the ends of each of said members being provided with lugs on their outer edges; said lugs being curved back upon their respective ends to overlap the respective sides of the other member.

2. In a finder comprising a pair of members, each having a central portion cut from one end; the ends of each of said members being provided with lugs on their outer edges; said lugs being curved back upon their respective ends to overlap the respective sides of the other member; the outer end of each of said members being slightly bent to limit the movement of said lugs in that direction.

3. In a finder comprising a pair of members, each having a central portion cut from one end to provide a vision opening; the ends of each of said members being provided with lugs on their outer edges; said lugs being curved back upon their respective ends to overlap the respective sides of the other member, there being divisional indications on said members adjacent said vision opening.

4. In a finder comprising a pair of U-shaped members, the ends of which are provided with portions adapted to overlap the sides of the other member so that said members may be reciprocated relative to each other, the meeting of said portions together limiting the reciprocation in one direction; the central portion of said U-shaped members being slightly bent to limit the reciprocation of said members in the other direction.

In testimony whereof, I affix my signature.
ALEXANDER F. NEWLANDS.
In testimony whereof, I affix my signature.
ERNEST FOSBERY.